United States Patent
Kottler et al.

(10) Patent No.: US 9,569,497 B2
(45) Date of Patent: Feb. 14, 2017

(54) LOCK-FREE GENERATION OF COLUMNS WITH MINIMAL DICTIONARIES AFTER PARALLEL AGGREGATION

(71) Applicants: Stephan Kottler, Gaggenau (DE); Nico Bohnsack, Walldorf (DE); Kai Stammerjohann, Wiesloch (DE)

(72) Inventors: Stephan Kottler, Gaggenau (DE); Nico Bohnsack, Walldorf (DE); Kai Stammerjohann, Wiesloch (DE)

(73) Assignee: SAP SE, Walldorf (DE)

( * ) Notice: Subject to any disclaimer, the term of this patent is extended or adjusted under 35 U.S.C. 154(b) by 269 days.

(21) Appl. No.: 14/301,272

(22) Filed: Jun. 10, 2014

(65) Prior Publication Data
US 2015/0149401 A1    May 28, 2015

Related U.S. Application Data

(60) Provisional application No. 61/909,321, filed on Nov. 26, 2013.

(51) Int. Cl.
G06F 17/30    (2006.01)

(52) U.S. Cl.
CPC ................ *G06F 17/30489* (2013.01)

(58) Field of Classification Search
USPC .................................. 707/602, 737
See application file for complete search history.

(56) References Cited

U.S. PATENT DOCUMENTS 8,150,850 B2 *  4/2012  Herrnstadt ........ G06F 17/30315
                                                          707/737
2011/0302164 A1 * 12/2011 Krishnamurthy . G06F 17/30979
                                                          707/737

\* cited by examiner

*Primary Examiner* — Hung T Vy
(74) *Attorney, Agent, or Firm* — Mintz Levin Cohn Ferris Glovksy and Popeo, P.C.

(57) ABSTRACT

A new dictionary can be created for a result column in a query plan operation executed on a database. The result column can be generated by multiple worker jobs running in parallel to read tasks from a shared queue as part of a query plan operation that includes a group-by column within an input set of input columns. The group-by column can include an original dictionary for all values contained within the group-by column If the new dictionary has fewer entries than the original dictionary for the group-by column such that mapping is required between old value identifiers within the group-by column and new value identifiers within the result column, the old value identifiers are renamed to the new value identifiers using a mapping vector.

20 Claims, 4 Drawing Sheets

US 9,569,497 B2

LOCK-FREE GENERATION OF COLUMNS WITH MINIMAL DICTIONARIES AFTER PARALLEL AGGREGATION

CROSS-REFERENCE TO RELATED APPLICATION

The current application claims priority under 35 U.S.C. §119(e) to U.S. Provisional patent application Ser. No. 61/909,321 filed on Nov. 26, 2013, the disclosure of which is incorporated by reference herein in its entirety.

TECHNICAL FIELD

The subject matter described herein relates to database management systems in general and, more particularly, to improving distributed query processing in such systems.

BACKGROUND

In a distributed database management system (DBMS), for example a main memory-based DBMS, aggregation within an online analytical processing (OLAP) engine can be highly parallelized. As a consequence of this a parallelization, computed results are typically distributed over several parts. These parts are moved to one processing node where all relevant data are collected to allow generation of corresponding result columns. Different parts are likely to have different sizes due to a "having filter" in the SQL statement that may remove an arbitrary number of rows. The task of a plan operation is the collection of all valid rows that may be returned directly to the user or constitute an input for a subsequent query. In general, result columns are either aggregation results or values that are part of the "group-by" statement of the input query.

Previously available approaches to plan operations have typically involved generating materialized columns, which do not maintain an additional dictionary but rather save each value directly within the column.

SUMMARY

The current subject matter is generally directed to approaches that may lead to improvement in "group-by" results. For example, consistent with implementations of the current subject matter, a lock-free column generation process can include generation of columns having minimal dictionaries after aggregation of results from parallelized database operations.

In one aspect, a method includes a plurality of worker jobs running in parallel to read tasks from a shared queue as part of a query plan operation that generates a result column The query plan operation includes a group-by column within an input set of input columns, and the group-by column includes an original dictionary for all values contained within the group-by column. A new dictionary that preserves a same ordering as the original dictionary is created for the result column. If the new dictionary is determined to have fewer entries than the original dictionary for the group-by column such that mapping is required between old value identifiers within the group-by column and new value identifiers within the result column, the old value identifiers are renamed to the new value identifiers using a mapping vector.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an in-memory database management system, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

The approaches described herein can result in one or more advantages, which can include, but are not limited to, storing large values only once in memory and allowing columns to contain value IDs to identify values. In many cases, a memory requirement of the result (e.g. for manipulation in main system memory) can be reduced drastically, especially for cases where the result has to be transferred to a different node. Additionally, subsequent queries (e.g. for subsequent JOIN operations on a result column or for subsequent searches) often require the result to have a dictionary to perform particular tasks. For these cases, a dictionary does not have to be created from scratch. Due to the lock-free implementation of the procedures discussed herein, the performance to compute the result columns can be improved significantly. For example, for some business warehouse queries the plan operation requires 800 milliseconds instead of 20 seconds using previously available approaches. An approach consistent with the current subject matter can consider the load of the system to adapt its strategy, which can remove duplicates locally as discussed below. Doing so can allow balancing of the load dynamically. Different strategies may be changed back and forth. As a consequence of generating minimal dictionaries, trivial results can be detected without extra effort. For example, if all rows within one column have the same value, the dictionary will have exactly one element. In this case, a special column can be created that does not store value IDs explicitly for each row.

Figure 1:
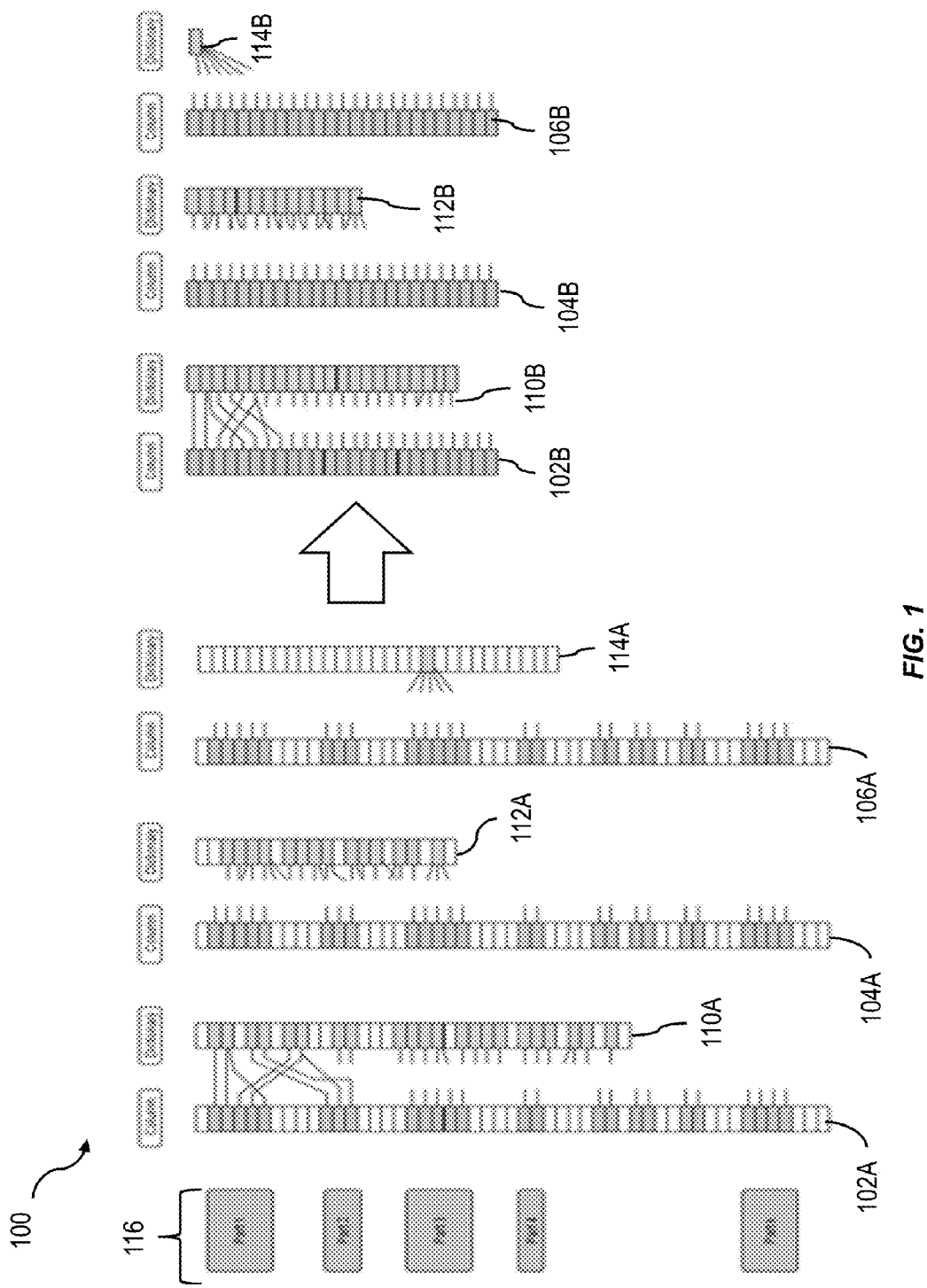
FIG. 1 shows a diagram illustrating removal of unused values in column dictionaries consistent with implementations of the current subject matter.

FIG. 1 shows a diagram 100 illustrating a plan operation. The left side of the diagram 100 shows the input to the plan operation, which includes several columns 102A, 104A, 106A with dictionaries 110A, 112A, 114A. Each part of a set of result parts 116 references a subpart of the input columns 102A, 104A, 106A. Thus, several rows in the input columns 102A, 104A, 106A are invalid for the result and, moreover, several rows in the corresponding dictionaries are not used. On the right side, the resulting columns 102B, 104B, 106B have minimal dictionaries 110B, 112B, 114B that contain only values that are referenced at least once by the corresponding column.

In an example of a parallelized database operation process, several worker jobs can run in parallel and read their tasks from a shared queue. Each task references a constant number of m consecutive rows to be generated in the result columns. It should be noted that m rows of one task are not restricted to belong to only one input part. Similarly, the number m need not be related to the number of input parts k. A worker job reads (and decodes) the values of the rows indicated by its current task of all input columns. Reading into a thread local storage can be performed row by row to speed up decoding, while writing can be performed column by column. At this stage, used value IDs can generally be advantageously marked (as being used) for each column (and its dictionary).

Figure 2:
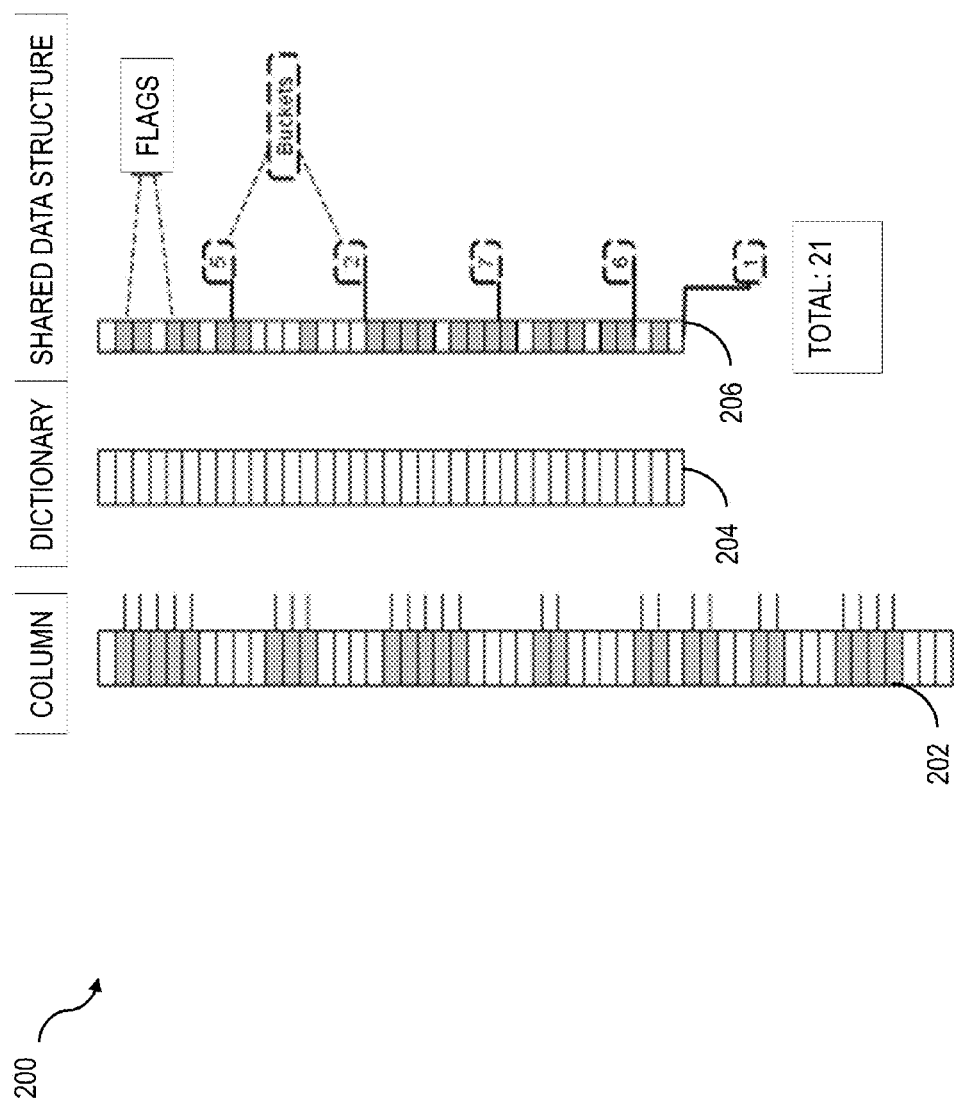
FIG. 2 shows a diagram illustrating registering of value IDs at three different places consistent with implementations of the current subject matter.

Registration of value IDs can be accomplished using three different kinds of counters as illustrated in the diagram 200 of FIG. 2. For each entry in the original dictionary 204 of one column 202, a shared data structure, such as for example a zero initialized bitvector 206, can be used to indicate if a value is used or not. This shared data structure 206 can be shared among all worker jobs processing the same column, and can include flags to indicate use or non-use of entries in the dictionary 204. In addition to these simple flags, each bucket of d elements in the original dictionary 204 can have a separate counter to indicate how many value IDs are used within the corresponding range. An additional counter can be used to indicate the number of all value IDs being used. Throughout the remainder of this disclosure, unless otherwise explicitly specified or otherwise inconsistent with its usage in context, the term "bitvector" is used to refer either specifically to an actual bitvector or, alternatively, to some other shared data structure capable of providing the necessary functionality to implement features of the subject matter as described.

Whenever a worker job (e.g. a worker thread) registers a value ID, the worker job can attempt to set the corresponding bit in the bitvector 206 by an atomic compare and swap operation. If this call fails (e.g. because the bit was already set before), the worker job can proceed with the next row. If the corresponding bit in the bitvector 206 is successfully set, the corresponding bucket counter can be incremented by one, and the total counter can also be incremented. Both increment operations are atomic.

To keep the overhead of atomic write operations as small as possible, each parallel worker job can process the columns to be written in different orders. Thus, the more columns the result contains the more likely it is that different workers operate on different columns at the same time. Such an approach can reduce the amount of concurrent atomic write operations on the same counter objects. If, at any one time, the totals counter equals to the original dictionary size, no value IDs are required to be registered for this column any longer by any worker job. If more than t jobs operate on the same column concurrently, the value IDs of one task range can be copied to a thread local buffer, which can be used to remove duplicate value IDs within each thread locally before the values are registered at the shared data structure.

In another stage of the process, new dictionaries are created. Parallel worker jobs can process different buckets (with d elements—see above) of the original dictionaries. Whenever a worker fetches a new bucket to be processed, the worker can know how many value IDs are contained in this bucket. Furthermore, the worker can know the start position of its entries in the new dictionary, which is simply the sum of all preceding bucket counters that have been added up along the way, whenever a worker fetches the next bucket. Accordingly, a worker job can write directly into the resulting dictionary in its exclusive range.

If the new dictionary has fewer elements than the original dictionary, a mapping vector from old value IDs to new value IDs can be created. This mapping vector can be created by the worker along the way (e.g. as the worker performs functions consistent with processing the results of one or more buckets of the original dictionaries). Entries in the mapping vector (one element per original value ID) can be written concurrently, since each range is advantageously processed by one worker exclusively.

Figure 3:
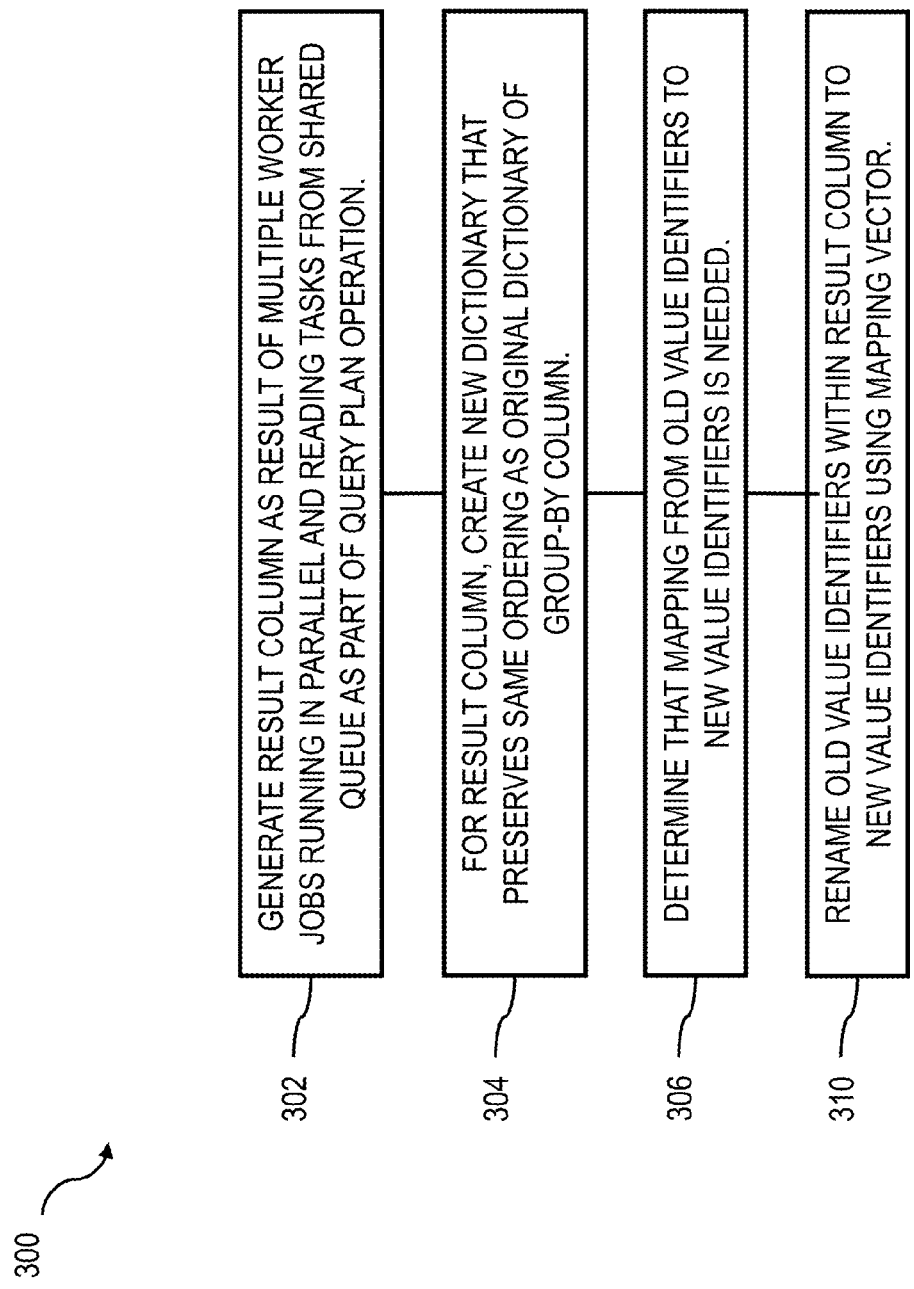
FIG. 3 shows a process flow diagram illustrating aspects of a method having one or more features consistent with implementations of the current subject matter.

Another stage of the process can be necessary only if there is a mapping from old value IDs to new value IDs (e.g. if the new dictionary has fewer entries than the original dictionary). The old value IDs within the whole column can be advantageously renamed by the new value IDs, which can be accomplished using the mapping vector (discussed above) for the corresponding column. As in the previously discussed stages, this task can be performed by different worker jobs in parallel, where every job processes particular ranges of a column FIG. 3 shows a process flow chart 300 illustrating features of a method consistent with implementations of the current subject matter. At 302, a result column is generated as a result of multiple worker jobs running in parallel and reading tasks from a shared queue as part of a query plan operation. These multiple worker jobs can optionally be executed by an OLAP engine, and the results can be distributed over several parts, which can advantageously already be moved to one node in a parallelized computing architecture. The parts may not have the same size since a "having filter" may have removed some values. Consistent with implementations of the current subject matter, all valid rows (e.g. aggregation values and "group-by" values) can be aggregated from different parts. Any original "group-by" columns can have a dictionary for all contained values.

However, in previously available approaches, a new (advantageously smaller) dictionary was not generated for the result columns.

At 304, a new dictionary is created for the result column corresponding to each group-by column (optionally of a plurality of "group-by" columns) in the query plan operation. This dictionary is minimal, which means that it contains only values that are used in the result column at least once. The dictionary also preserves the same ordering as the dictionary of the original column, which can be advantageous for further SQL statements that consume the results (e.g. if subsequent queries use these columns for JOIN operations or searches). Having the dictionary minimal implies that special cases where all cells in one column have the same value can be easily detected. Even though the algorithm is highly parallel, it need not make use of operation system locks. Accesses to shared data that need to be atomic can be implemented by compare and swap operations.

At 306, a determination is made that mapping is required between old value identifiers within the result column and new value identifiers within the result column This determination results if the new dictionary has fewer entries than the original dictionary for the group-by column At 310, if a mapping from old value IDs to new value IDs is required (e.g. because the new dictionary has fewer entries than the original dictionary), the old value IDs within the result column are renamed by the new value IDs using a mapping vector as discussed above.

Figure 4:
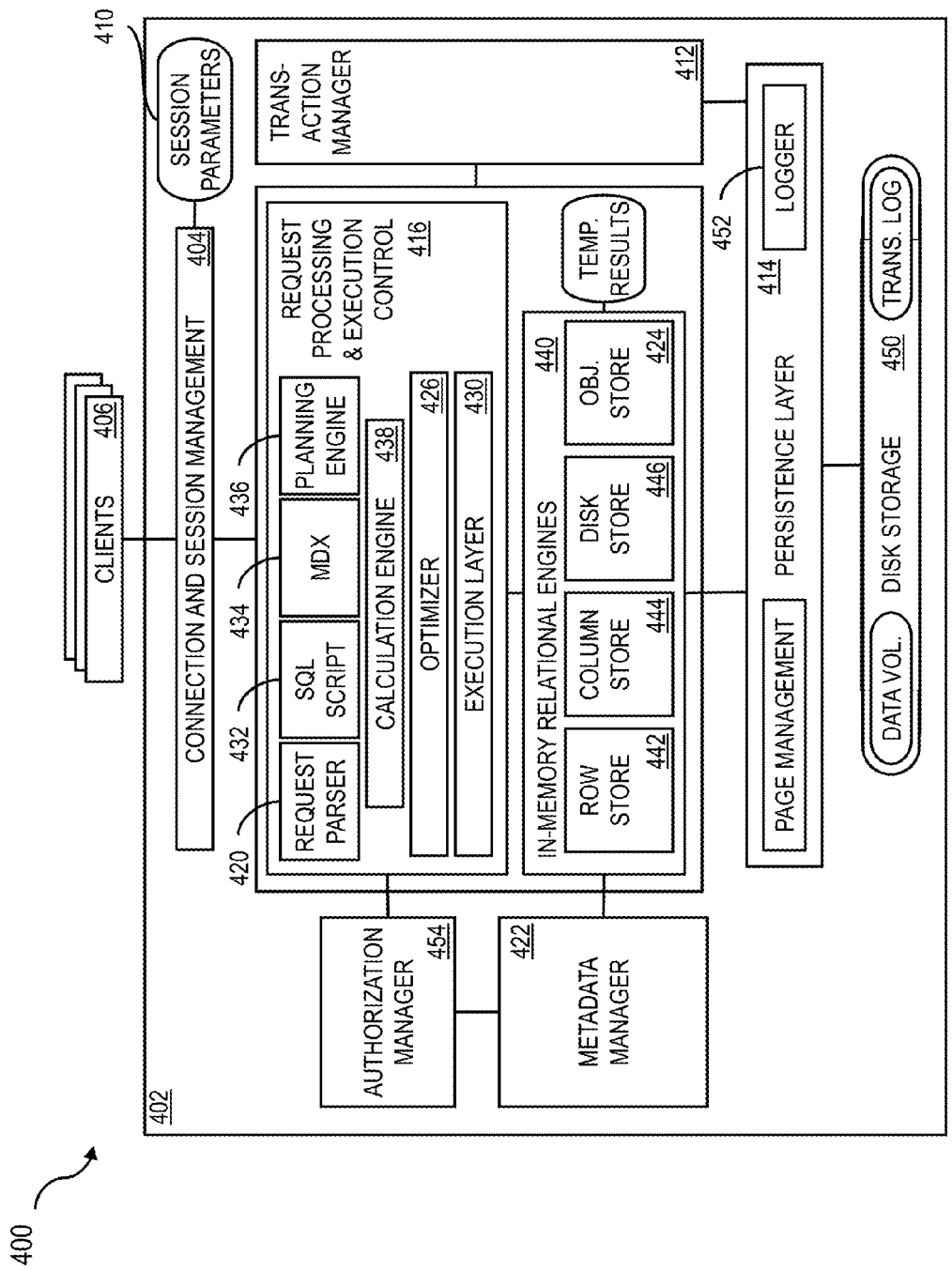
FIG. 4 is a diagram illustrating aspects of a system showing features consistent with implementations of the current subject matter; and When practical, similar reference numbers denote similar structures, features, or elements.

FIG. 4 shows a block diagram of an in-memory relational database server 400 consistent with implementations of the current subject matter. A connection and session management component 402 of an in-memory database system 404 creates and manages sessions and connections for the database clients 406. For each session a set of parameters 410 is maintained such as for example auto commit settings or the current transaction isolation level. Once a session is established, database clients 406 can use logical (e.g. SQL) statements to communicate with the in-memory database system 404. For analytical applications the multidimensional query language MDX can also be supported.

Each statement can be processed in the context of a transaction. New sessions can be implicitly assigned to a new transaction. A transaction manager 412 can coordinate transactions, control transactional isolation, and keep track of running and closed transactions. When a transaction is committed or rolled back, the transaction manager 412 can inform the involved engines about this event so they can execute necessary actions. The transaction manager 412 can cooperate with a persistence layer to achieve atomic and durable transactions.

Requests received from the database clients 406 can be analyzed and executed by a set of request processing and execution control components 416, which can include a request parser 420 that analyses a request from a database client 406 and dispatches it to a responsible component. Transaction control statements can, for example, be forwarded to the transaction manager 412, data definition statements can be dispatched to a metadata manager 422 and object invocations can be forwarded to an in-memory object store 424. Data manipulation statements can be forwarded to an optimizer 426, which creates an optimized execution plan that is provided to an execution layer 430. The execution layer 430 can act as a controller that invokes the different engines and routes intermediate results to a next phase in execution of the execution plan.

Built-in support can be offered for domain-specific models (such as for financial planning) scripting capabilities that allow to run application-specific calculations inside an in-memory database system. A scripting language, for example SQL Script 432, which is based on side effect free functions that operate on tables using SQL queries for set processing, can be used to enable optimizations and parallelization. The MDX language 434 can be used to provide support for multidimensional queries. A planning engine 436 can allow financial planning applications to execute basic planning operations in the database layer. An example of a basic planning operation is to create a new version of a data set as a copy of an existing one while applying filters and transformations. For example, planning data for a new year can be created as a copy of the data from the previous year. This operation requires filtering by year and updating the time dimension. Another example of a planning operation can be a disaggregation operation that distributes target values from higher to lower aggregation levels based on a distribution function.

Features such as SQL Script 432, MDX 434, and planning engine 436 operations can be implemented using a common infrastructure called a calculation engine 438. Metadata can be accessed via the metadata manager component 422. Metadata can include a variety of objects, such as for example definitions of relational tables, columns, views, indexes, SQL Script functions, object store metadata, and the like. All of these types of metadata can be stored in a common catalog for all stores (in-memory row store, in-memory column store, object store, disk based). Metadata can be stored in tables in row store. In multi-tenant systems and in distributed systems, central metadata can be shared across servers and tenants as discussed in greater detail below. How metadata is stored and shared can be hidden from the components that use the metadata manager 422.

One or more relational engines 440, for example an in-memory row store 442, an in-memory column store 444, a disk-based store 446, and the in-memory object store 424 mentioned above can communicate with the request processing and execution control components 416, the metadata manager 422, and the in-memory persistence layer 414. The row store 442 and column store 444 are each relational in-memory data engines that can store data in a row-based or column-based way, respectively. Some data, such as for example tracing data, need not be kept in memory all the time. The disk-based store 446 can handle such data. Data in the disk-based store 146 can be primarily stored in disk storage 450 and only moved to memory buffers (e.g. the persistence layer 414) when accessed.

When a table is created, the table can be specified in the store in which it is located. Table can be moved to different stores at a time after their creation. Certain SQL extensions can optionally be available only for specific stores (such as for example the "merge" command for a column store). However, standard SQL can be used on all tables. It is also possible to combine tables from different stores in one statement (e.g. using a join, sub query, union, or the like).

As row based tables and columnar tables can be combined in one SQL statement, the corresponding engines must be able to consume intermediate results created by the other. Two engines can differ in the way they process data. Row store operations, for example, can process data in a row-at-a-time fashion using iterators. Column store operations (such as for example scan, aggregate, and so on) can require that the entire column is available in contiguous memory locations. To exchange intermediate results, a row store can provide results to a column store materialized as complete rows in memory while a column store can expose results using the iterator interface needed by a row store.

The persistence layer 414 can be responsible for durability and atomicity of transactions and can ensure that the database is restored to the most recent committed state after a restart and that transactions are either completely executed or completely undone. To achieve this goal in an efficient way, the persistence layer 414 can use a combination of write-ahead logs, shadow paging and save points. The persistence layer 414 can offer interfaces for writing and reading data and can also contain a logger 452 that manages the transaction log. Log entries can be written implicitly by the persistence layer 414 when data are written via a persistence interface or explicitly by using a log interface.

An authorization manager 454 can be invoked by other components of the architecture to check whether a user has the required privileges to execute the requested operations. Privileges can be granted to users or roles. A privilege grants the right to perform a specified operation (such as for example create, update, select, execute, and the like) on a specified object (such as for example a table, view, SQL Script function, and the like). Analytic privileges that represent filters or hierarchy drill down limitations for analytical queries can also be supported. Analytical privileges can grant access to values with a certain combination of dimension attributes. This could for example be used to restrict access to a cube with sales data to values with dimension attributes such as region="US" and year="2010."

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together."

Use of the term "based on," above and in the claims is intended to mean, "based at least in part on," such that an unrecited feature or element is also permissible.

Other implementations may be within the scope of the following claims.

What is claimed is:

1. A computer program product comprising a machine-readable medium storing instructions that, when executed by at least one programmable processor, cause the at least one programmable processor to perform operations for improving distributed query processing in a database management system, the operations comprising:

generating a result column, the generating comprising a plurality of worker jobs running in parallel to read tasks from a shared queue as part of a query plan operation, the query plan operation comprising a group-by column within an input set of input columns, the group-by column comprising an original dictionary for all values contained within the group-by column;

creating a new dictionary for the result column, the new dictionary preserving a same ordering as the original dictionary;

determining that the new dictionary has fewer entries than the original dictionary for the group-by column such that mapping is required between old value identifiers within the group-by column and new value identifiers within the result column; and renaming the old value identifiers to the new value identifiers using a mapping vector.

2. A computer program product as in claim 1, wherein the query plan operation comprises a plurality of group-by columns, the plurality of group-by columns comprising the group-by column, and wherein the operations further comprise creating an additional new dictionary for each result column of the group-by columns in the plurality of group-by columns.

3. A computer program product as in claim 1, wherein the new dictionary contains only values that are used in the result column at least once, and wherein the new dictionary preserves a same ordering as the original dictionary.

4. A computer program product as in claim 1, wherein the operations further comprise:

executing the multiple worker jobs by an online analytical processing engine; and distributing the result column over a plurality of parts.

5. A computer program product as in claim 1, wherein the generating of the new dictionary comprises the multiple worker jobs indicating use or non-use of entries in the original dictionary.

6. A computer program product as in claim 1, wherein the mapping vector comprises a bitvector that is shared among all of the plurality of worker jobs, and wherein when a worker job of the plurality of worker jobs registers a value identifier, that worker job attempts to set a corresponding bit in the bitvector by an atomic compare and swap operation.

7. A system comprising:

computer hardware configured to perform operations for improving distributed query processing in a database management system, the operations comprising:

generating a result column, the generating comprising a plurality of worker jobs running in parallel to read tasks from a shared queue as part of a query plan operation, the query plan operation comprising a group-by column within an input set of input columns, the group-by column comprising an original dictionary for all values contained within the group-by column;

creating a new dictionary for the result column, the new dictionary preserving a same ordering as the original dictionary;

determining that the new dictionary has fewer entries than the original dictionary for the group-by column such that mapping is required between old value identifiers within the group-by column and new value identifiers within the result column; and renaming the old value identifiers to the new value identifiers using a mapping vector.

8. A system as in claim 7, wherein the query plan operation comprises a plurality of group-by columns, the plurality of group-by columns comprising the group-by column, and wherein the operations further comprise creating an additional new dictionary for each result column of the group-by columns in the plurality of group-by columns.

9. A system as in claim 7, wherein the new dictionary contains only values that are used in the result column at least once, and wherein the new dictionary preserves a same ordering as the original dictionary.

10. A system as in claim 7, wherein the operations further comprise:

executing the multiple worker jobs by an online analytical processing engine; and distributing the result column over a plurality of parts.

11. A system as in claim 7, wherein the generating of the new dictionary comprises the multiple worker jobs indicating use or non-use of entries in the original dictionary.

12. A system as in claim 7, wherein the mapping vector comprises a bitvector that is shared among all of the plurality of worker jobs, and wherein when a worker job of the plurality of worker jobs registers a value identifier, that worker job attempts to set a corresponding bit in the bitvector by an atomic compare and swap operation.

13. A system as in claim 7, wherein the computer hardware comprises:

a programmable processor; and a machine-readable medium storing instructions that, when executed by the programmable processor, cause the programmable processor to perform at least some of the operations.

14. A computer-implemented method for improving distributed query processing in a database management system, the method comprising:

generating a result column, the generating comprising a plurality of worker jobs running in parallel to read tasks from a shared queue as part of a query plan operation, the query plan operation comprising a group-by column within an input set of input columns, the group-by column comprising an original dictionary for all values contained within the group-by column;

creating a new dictionary for the result column, the new dictionary preserving a same ordering as the original dictionary;

determining that the new dictionary has fewer entries than the original dictionary for the group-by column such that mapping is required between old value identifiers within the group-by column and new value identifiers within the result column; and renaming the old value identifiers to the new value identifiers using a mapping vector.

15. A computer-implemented method as in claim 14, wherein the query plan operation comprises a plurality of group-by columns, the plurality of group-by columns comprising the group-by column, and wherein the operations further comprise creating an additional new dictionary for each result column of the group-by columns in the plurality of group-by columns.

16. A computer-implemented method as in claim 14, wherein the new dictionary contains only values that are used in the result column at least once, and wherein the new dictionary preserves a same ordering as the original dictionary.

17. A computer-implemented method as in claim 14, further comprising:
   executing the multiple worker jobs by an online analytical processing engine; and
   distributing the result column over a plurality of parts.

18. A computer-implemented method as in claim 14, wherein the generating of the new dictionary comprises the multiple worker jobs indicating use or non-use of entries in the original dictionary.

19. A computer-implemented method as in claim 14, wherein the mapping vector comprises a bitvector that is shared among all of the plurality of worker jobs, and wherein when a worker job of the plurality of worker jobs registers a value identifier, that worker job attempts to set a corresponding bit in the bitvector by an atomic compare and swap operation.

20. A computer-implemented method as in claim 14, wherein at least one of the generating, the creating, the determining, and the renaming are performed by computer hardware.

* * * * *